United States Patent
Morton

(10) Patent No.: US 8,539,471 B2
(45) Date of Patent: Sep. 17, 2013

(54) UPDATING FIRMWARE OF AN ELECTRONIC DEVICE

(75) Inventor: Derek Morton, Farnborough (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 485 days.

(21) Appl. No.: 12/747,900

(22) PCT Filed: Nov. 21, 2008

(86) PCT No.: PCT/EP2008/066017
§ 371 (c)(1),
(2), (4) Date: Sep. 5, 2010

(87) PCT Pub. No.: WO2009/074444
PCT Pub. Date: Jun. 18, 2009

(65) Prior Publication Data
US 2010/0325622 A1 Dec. 23, 2010

Related U.S. Application Data

(60) Provisional application No. 61/013,365, filed on Dec. 13, 2007.

(51) Int. Cl.
*G06F 9/44* (2006.01)

(52) U.S. Cl.
USPC .............................. 717/168; 717/171; 717/173

(58) Field of Classification Search
None
See application file for complete search history.

(56) References Cited

U.S. PATENT DOCUMENTS

| 5,230,050 A | 7/1993 | Iitsuka et al. |
| 5,469,572 A | 11/1995 | Taylor |
| 6,560,703 B1 | 5/2003 | Goodman |

(Continued)

FOREIGN PATENT DOCUMENTS

| EP | 0472812 A1 | 5/1991 |
| EP | 0 849 667 A2 | 6/1998 |

(Continued)

OTHER PUBLICATIONS

Han, Chih-Chieh; Kumar, Ram; Shea, Roy; and Srivastava, Mani, Sensor Network Software Upate Management: A Survey, [Online] Int. J. Network Mgmt 2005, vol. 15, [Retrieved from the Internet] <http://onlinelibrary.wiley.com/doi/10.1002/nem.574/pdf> pp. 283-294.*

(Continued)

*Primary Examiner* — Thuy Dao
*Assistant Examiner* — Ravi K Sinha
(74) *Attorney, Agent, or Firm* — Potomac Patent Group PLLC

(57) ABSTRACT

Disclosed is a method for updating software of an electronic device from a current to an updated version. A first set of load modules of the software is required for operating the electronic device in an update mode. The method comprises: receiving and storing incremental update instructions, executing a first set of update instructions so as to update the stored current version of the first set of load modules with the generated updated version of the first set of load modules; booting the electronic device in said update mode in which only the updated version of the first set of load modules is executed; and executing a stored second set of update instructions so as to perform an in-place update of the rest of the load modules.

16 Claims, 4 Drawing Sheets

(56) References Cited

U.S. PATENT DOCUMENTS

| | | | |
|---|---|---|---|
| 6,754,895 B1* | 6/2004 | Bartel et al. | 717/171 |
| 7,149,508 B2* | 12/2006 | Herle | 717/171 |
| 7,373,643 B2 | 5/2008 | Radatti | 717/173 |
| 7,543,118 B1 | 6/2009 | Chen et al. | 717/168 |
| 7,587,433 B2* | 9/2009 | Peleg et al. | 1/1 |
| 7,702,896 B1* | 4/2010 | Polyudov | 713/2 |
| 7,725,889 B2* | 5/2010 | Gustafson et al. | 717/168 |
| 8,046,753 B1* | 10/2011 | Qumei | 717/173 |
| 8,245,220 B2* | 8/2012 | Imamatsu | 717/173 |
| 8,296,535 B2* | 10/2012 | Eker et al. | 711/162 |
| 2003/0212715 A1 | 11/2003 | Bangel et al. | |
| 2004/0133887 A1* | 7/2004 | Herle et al. | 717/171 |
| 2005/0114852 A1* | 5/2005 | Chen et al. | 717/168 |
| 2005/0204353 A1* | 9/2005 | Ji | 717/168 |
| 2006/0053417 A1* | 3/2006 | Henderson et al. | 717/168 |
| 2007/0006208 A1* | 1/2007 | Nguyen et al. | 717/168 |
| 2007/0006211 A1* | 1/2007 | Venkiteswaran | 717/168 |
| 2007/0169099 A1* | 7/2007 | Rao et al. | 717/168 |
| 2007/0220504 A1* | 9/2007 | Eker | 717/168 |
| 2009/0070374 A1* | 3/2009 | Eker et al. | 707/104.1 |
| 2009/0125897 A1* | 5/2009 | Matlin et al. | 717/168 |

FOREIGN PATENT DOCUMENTS

| | | |
|---|---|---|
| EP | 1501196 A1 | 1/2005 |
| WO | 03/009136 A1 | 1/2003 |
| WO | 03/025742 A2 | 3/2003 |
| WO | 2004/095457 A | 11/2004 |
| WO | 2005/050441 A1 | 6/2005 |
| WO | 2005/085996 A1 | 9/2005 |
| WO | 2005/101200 A | 10/2005 |
| WO | 2007/071324 A1 | 6/2007 |

OTHER PUBLICATIONS

Bernd Steinke, The utilisation of peer-to-peer techniques in autonomous mobile phone device management: Efficient framework for advanced device self-management, [Online] 10th IEEE Singapore International Conference on Communication systems, 2006, [Retrieved from the Internet] <http://ieeexplore.ieee.org/stamp/stamp.jsp?tp=&arnumber=4085824> 5 pages.*

Rasch, David, and Randal Burns, In-place rsync: file synchronization for mobile and wireless devices., [Online] Proc. of the USENIX Annual Technical Conference. 2003, [Retrieved from the Internet] <http://hssl.cs.jhu.edu/ip-rsync/ip-rsync.pdf> 10 pages.*

PCT International Search Report, dated Jun. 15, 2009, in connection with International Application No. PCT/EP2008/066017.

PCT International Preliminary Report on Patentability, dated Nov. 23, 2009, in connection with International Application No. PCT/EP2008/066017.

* cited by examiner

UPDATING FIRMWARE OF AN ELECTRONIC DEVICE

CROSS-REFERENCE TO RELATED APPLICATIONS

This application claims the benefit of U.S. Provisional Application No. 61/013,365, filed Dec. 13, 2007, which is hereby incorporated herein by reference in its entirety.

TECHNICAL FIELD

This invention generally relates to the updating of software stored in a persistent memory of an electronic device.

BACKGROUND AND DESCRIPTION OF RELATED ART

Many modern electronic devices, e.g. handheld devices such as portable/hand-held communications devices, e.g. mobile telephones, communicators, pagers, or other portable/hand-held devices such as personal digital assistants, personal entertainment devices, such as mp3 players, etc., are controlled by software stored in flash memory. For the purpose of the present description, software stored in a persistent memory of an electronic device that controls operation of, or runs on the electronic device such that during normal operation of the electronic device it cannot be stopped and/or started separately from the electronic device as a whole will be referred to as firmware. Hence, the firmware may be regarded as forming the software core of the system on which it runs. In addition to the firmware, other software may be stored and executed on the electronic device; such other software may generally be started and stopped by a user of the electronic device during normal operation of the electronic device, separately from the start-up/shut-down of the electronic device and the firmware. An electronic device controlled by firmware stored in persistent memory of said electronic device is also referred to as embedded device or embedded system, and the firmware is referred to as being embedded into the electronic device. Even though the firmware of an electronic device is typically not changed during normal operation of the device, updates of the firmware may be desirable or even necessary during the lifetime of an electronic device, e.g. in order to install new functionality, update existing functionality, correct errors in the firmware, and/or the like. It will be appreciated that an electronic device may have stored thereon further software components, such as application software, that provide additional functionality to a user of the electronic device but which are not required for the operation of the electronic device.

An update of the firmware of an electronic device involves a number of specific problems e.g. when compared to a software update of a personal computer:

To update an application on a personal computer, that application must normally be stopped if it is running. The update is then performed by overwriting the installed application files with new versions. The core operating system (OS) does not generally contain any dedicated update software. Updates are performed by running an application which performs the necessary changes to the system. To update active parts of the software, e.g. the OS itself, a reboot is required to complete the process. Where there are post reboot actions required, the application is scheduled to be started after the reboot. This process is not inherently crash safe. If the update is interrupted the application will be broken and the user must take actions to repair it.

Embedded devices on the other hand often use flash memory for persistent storage, because it allows multiple rewrites. Flash memory generally includes memory sectors, and write and/or read operations of the flash memory are typically performed in multiples of such memory sectors. When the firmware stored in a flash memory of an electronic device is updated, e.g. in order to add new features to the software and/or to correct errors in the current version of the firmware, some or all of the memory sectors of the flash memory are re-written/re-programmed (this process is often referred to as "re-flashing"). Any space for user data will typically be partitioned separately from the firmware, and there is normally no space available for complete copies of the firmware image, so updates are typically performed 'in place'. The new version of the firmware is typically written over the top of the old version. During the update process the firmware stored in persistent memory will be partly the old firmware and partly the new firmware. Trying to execute the firmware in this state would produce unpredictable results at best, and most likely a crash.

An embedded system will generally be running a real time operating system. Simple systems may not run an operating system at all. Unlike on a personal computer, all the firmware is active during operation of the embedded system and it is not possible to close an application that is part of the firmware in order to update it. If any part of such an embedded system crashes, the whole system crashes. Due to these limitations, the update process should be designed to be fail-safe, or an interruption to the update will result in a broken device.

In particular, an application where reliability of the update process is of great concern is the over-the-air (OTA) update of communications devices such as mobile terminals, i.e. an update where the updated software is received from a remote update system via a cellular communications network. The over-the-air update of the firmware of such a communications device is also referred to as Firmware-Over-The-Air (FOTA) update.

WO 03/025742 discloses a method of updating software in a remote device, where the software stored on the device is partitioned into a boot partition, a core firmware partition, and an auxiliary software partition. During a software update, the auxiliary software partition is initially overwritten by the updated version of the core firmware. In a next step, the device is rebooted with the new core firmware, and the updated auxiliary software is downloaded and written on top of the old core firmware. Even though this process allows an update of the software of an electronic device that has not enough memory for an entire additional copy of the software, this process requires a complete update of the entire software in order to again reach a fully operational state. It would thus be desirable to provide a more efficient update process that requires less download time and/or bandwidth. Furthermore, the above prior art process depends on its ability to re-connect to the host from which the software update is downloaded after the reboot or at least after a power loss or other interruption of the update process so as to download the auxiliary software. If the process fails to reconnect to the host, the device is left in an inoperational state. It thus remains a problem to provide an update process that has a higher degree of fail-safety.

SUMMARY

Disclosed herein is a method for updating software of an electronic device from a current version of the software to an updated version of the software, the electronic device comprising a storage medium having stored therein the current version of the software. Embodiments of the method disclosed herein comprise the following steps performed by the electronic device:

receiving incremental update instructions for causing the electronic device to transform the stored current version of the software into the updated version of the software; wherein the software comprises a first and a second set of load modules, the received incremental update instructions comprising a first set of update instructions for causing the electronic device to generate an updated version of the first set of load modules, the received incremental update instructions further comprising a second set of update instructions for causing the electronic device to generate an updated version of the second set of load modules;

storing at least the second set of update instructions in the storage medium;

executing the first set of update instructions so as to update the stored current version of the first set of load modules to the generated updated version of the first set of load modules;

booting the electronic device in an update mode in which the updated version of the first set of load modules is executed;

executing the stored second set of update instructions so as perform an in-place update of the second set of load modules, the in-place update comprising replacing the stored current version of the second set of load modules with the generated updated version of the second set of load modules.

Accordingly, embodiments of the method described herein comprise performing an incremental update, thereby only requiring a relatively small update package to be downloaded and stored in the storage medium of the electronic device. Such an incremental update is also referred to as a delta update, as the update package just contains the differences between the current and the updated versions of the software and is therefore typically considerably smaller than the software to be updated.

As the first set of load modules only needs to include a small part of the firmware sufficient for performing an update, the second set of load modules includes the majority of the software. For example, when the electronic device is a portable radio communications device for communicating via a radio communications network, the software may include communications functionality for establishing radio communications between the communications device and another communications device of the radio communications network, e.g. a base station. As the entire set of update instructions is downloaded and at least the second set of update instructions is stored in the persistent memory prior to the update, once the update instructions are received and verified, the electronic device does not need to contact a remote entity such as a base station during the remainder of the update process, not even in case the update process is interrupted and has to be resumed. Thus, the entire communications functionality, including functionality required for establishing contact with a base station of a cellular network, may be included in the second set of load modules, thereby keeping the size of the first set of load modules, and thus the required memory for a fail-safe update of the first set of load modules, small.

When the first set of load modules comprises a core load module adapted to provide a minimal set of basic system services required for operation of the electronic device, and a second load module adapted to provide a minimal set of basic services required by the update process, the first set of load modules is kept small, thereby reducing the required storage capacity for a fail-safe update of the first set of load modules. The core load module may comprise a core operating system of the electronic device and one or more required physical drivers. The second load module may comprise program code required for controlling the electronic device to indicate a progress of the update process to a user of the electronic device.

Furthermore, since at least the second set of load modules is changed in-place, i.e. the updated version of the second set of load modules is written into substantially the same part of the storage medium that is occupied by the current version of the second set of load modules, an overwriting of a part of the current software prior to its update is not required, thereby rendering the process more fail-safe. It will be appreciated that the current and updated versions may have a different size, thereby causing the updated version after the in-place update to occupy additional memory space compared to the current version and/or leave some of the memory space previously occupied by the current version unoccupied. Additionally, since the first set of load modules is small, a fail-safe update that does not require an overwriting of the second set of load modules can be achieved without large amounts of free memory.

Furthermore, when only a portion of the entire firmware requires an update, only that portion actually needs to be rewritten, thus providing a time efficient update process, in particular in connection with memory types that require a multi-step write process, e.g. where old content first has to be deleted before new content can be written to the same portion of memory. Also, as some memory technologies only allow a memory to be re-written a limited number of times, the lifetime of the memory of the electronic device is not unnecessarily reduced.

Furthermore, as the delta update is received and stored in the storage medium prior to the update, there is no need to download or re-download parts of the update once the actual update process has been initiated. Even in the event of an interruption of the update process, e.g. due to a power shortage/failure, embodiments of the update process described herein can be resumed and completed without having to re-download any part of the updated software. This may be particularly advantageous in situations where the old version of some or all of the load modules of the second set of load modules cannot operate together with the updated versions of load modules of the first set.

Hence, embodiments of the method described herein provide a high-degree of fail-safety without the need for a large amount of free persistent memory.

Furthermore, embodiments of the method described herein provide a modular architecture of the software where there is no duplication of code or functionality. In some embodiments of this architecture, an update agent is treated as a load module within the system, in particular a load module of the first set of load modules. Furthermore, the first set of load modules comprising the software functionality required for performing the update may be used both during the update process and during normal operation, thus minimizing code duplication in connection with the update functionality and providing a resource-efficient update mechanism. The second set of load modules is not required for operating the device in the update mode, i.e. the electronic device is operatable in the update mode without execution of the second set of load modules.

For the purpose of the present description the terms persistent memory and non-volatile memory are both intended to refer to any form of computer-readable memory that can retain the stored information even when not powered.

For the purpose of the present description the term load module is intended to comprise an identifiable unit of software that can be identified in persistent memory and is suitable for execution either in-place, i.e. directly from the persistent memory, or by loading the load module from the persistent memory into a primary memory (e.g. a RAM) of a processing unit. It will be appreciated that during the update of the first and/or second set of load modules one or more of the load modules of the corresponding first and/or second set of load modules may remain unchanged, i.e. an update of a set of load modules does not necessarily involve a change of all the load modules of the set.

In some embodiments executing the first set of update instructions so as to update the stored current version of the first set of load modules with the generated updated version of the first set of load modules comprises creating a backup of the first set of load modules and executing the first set of update instructions so as to replace the stored backup of the first set of load modules with the generated updated version of the first set of load modules;

switching the backup and original versions of the first set of load modules.

Consequently, by applying the received update instructions to a backup of the current version of the first set of load modules, the electronic device may still be operated even if the generation of the updated version of the first set of load modules fails. For example, the switching step may be performed by changing a pointer or other reference indicating—e.g. to a boot program—the position of the first set of load modules such that the changed pointer or other reference points to the updated version of the first set of load modules.

Generally, in some embodiments, the update of the first set of load modules is performed in a fail-safe manner, i.e. such that the electronic device is bootable at least in a state that allows a continuation/resumption or restarting of the update process, even if an initial attempt of performing the update process has been interrupted or has otherwise failed. It will be appreciated that the exact sequence of steps for performing a fail-safe update of the first set of load modules may differ. For example, in some embodiments the update may be performed to the backup of the first set of load modules then switch them, while in other embodiments the update may be performed to the original version of the first set of load modules. In the latter embodiment, the backup may be loaded at startup if an interrupted update is detected. The choice of the exact sequence may depend on the specific implementation, e.g. depending on whether the code is executed in place.

In some embodiments, the entire set of received update instructions is stored in the storage medium, so as to avoid the necessity of receiving the first set of update instructions again in case the update of the first set of load modules fails, thus providing a fail-safe update of the first set of load modules.

In some embodiments, the electronic device further has stored thereon a boot loader program, and booting the electronic device in the update mode comprises:

executing the boot loader program, initiating execution of at least one of the first set of load modules under the control of the boot loader program, optionally terminating execution of the boot loader program, initiating execution of the update agent under the control of the at least one of the first set of load modules.

In some embodiments, the method further comprises executing the updated versions of the second set of load modules after successful completion of the update of the second set of load modules. In particular, the updated version of the second set of load modules may be executed directly after completion of the update of the second set of load modules, i.e. without any need for a second reboot of the electronic device.

It is noted that the features of the methods described above and in the following may be implemented in software and carried out by processing means of an electronic device caused by the execution of program code means such as computer-executable instructions. Here and in the following, the term processing means comprises any circuit and/or device suitably adapted to perform the above functions. In particular, the term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The present invention relates to different aspects including the method described above and in the following, a corresponding electronic device, and further product means, each yielding one or more of the benefits and advantages described in connection with the above-mentioned method, and each having one or more embodiments corresponding to the embodiments described in connection with the above-mentioned method and or as disclosed in the dependent claims.

In particular, disclosed herein are embodiments of an electronic device controllable by software, the electronic device comprising a storage medium having stored therein a current version of the software, wherein the electronic device is configured to perform the steps of the method described above and in the following.

For the purpose of the present description, the term electronic device comprises any device comprising a storage medium such as a flash memory or other form of persistent memory for storing program code. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, media players, such as mp3 players, digital cameras or other recording devices, embedded devices in the automotive industry, medical devices, or the like.

The storage medium may be a non-volatile storage medium, such as flash memory. It will be appreciated though that the method and apparatus described herein may also be implemented in connection with other types of storage media.

In one aspect, disclosed herein is a computer program product comprising a boot loader program and software, the computer program product comprising program code means adapted to cause an electronic device to perform the steps of the method described above and in the following when said program code means are executed by the electronic device.

BRIEF DESCRIPTION OF THE DRAWINGS

The above and other aspects will be apparent and elucidated from the embodiments described in the following with reference to the drawings in which.

DETAILED DESCRIPTION

Figure 1:
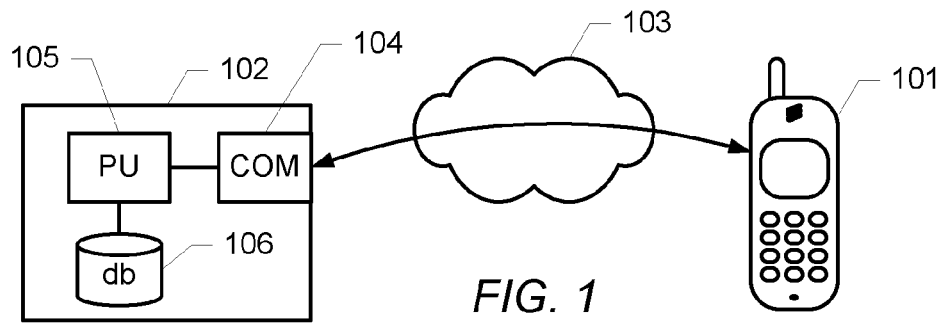
FIG. 1 schematically shows a block diagram of an embodiment of a system for updating software in an electronic device.

FIG. 1 schematically shows a block diagram of an embodiment of a system for updating software in an electronic device such as a mobile terminal. The system comprises an electronic device 101, e.g. a mobile telephone or the like, a software updating system 102, and a communications interface 103.

The software updating system 102 may comprise a server computer having access to the communications network. In some embodiments, the functionality of the server computer may be distributed among a plurality of computers, e.g. computers connected via a computer network, e.g. a local area network, a wide area network, an Internet, or the like. The software updating system 102 comprises an interface circuit 104 allowing the software updating system to communicate data via the communications interface 103. For example, the interface circuit may comprise a serial port, a parallel port, a short range wireless communications interface, e.g. an infrared port, a Bluetooth transceiver, or the like. Further examples of interface circuits include a network card, a DSL modem, a gateway computer, or the like.

The software updating system further comprises a processing unit 105, e.g. the CPU of a server computer, suitably programmed to control and perform the update process including the generation of the updated program code as described herein. The processing unit may further comprise a version database 106 having stored therein memory images of at least a base version and an updated version of the software to be updated. In some embodiments, the version database may further comprise additional information, e.g. a plurality of base versions and/or updated versions, e.g. for different models of electronic devices, for different groups of customers, and/or the like.

The communications interface 103 may be any suitable wired or wireless communications interface for communicating data between the software updating system 102 and the electronic device 101. For example, in the case of a mobile telephone adapted to communicate via a cellular communications network, e.g. a GSM network, a UMTS network, a GPRS network, or the like, the communication between the software updating system and the electronic device in connection with a software update may be performed via that cellular communications network, thereby avoiding the need for additional communications interfaces in the electronic device. It is further understood that the communication between the electronic device and the software updating system may involve more than one communications networks. For example, the mobile phone may communicate via a base station and a cellular telecom network with a gateway system that, in turn, provides communication with the software updating system via the Internet.

Hence, in order to update software on the electronic device 101, e.g. the firmware of the electronic device or parts thereof, the electronic device may connect to the software updating system 102. Alternatively, the software updating system may connect to the electronic device once an updated software version is available. Once connected to the software updating system, the electronic device may send information to the software updating system about its current software version. The communication may be performed via a suitable updating protocol, e.g. a protocol built on top of a TCI/IP protocol. Based on the information received from the electronic device, the software updating system may generate a dedicated updating message/package comprising updating instructions to the electronic device. In some embodiments, the updating instructions include the images of the memory sectors to be rewritten. In some embodiments, the same update package may be used for a plurality of electronic devices. In a differential updating system using delta files, the updating instructions are generated such that they enable the electronic device to generate the updated software version from the existing version already stored in the electronic device and from additional information included in the updating instructions. Suitable techniques for generating delta files are known in the art, e.g. as described in WO 05/085996.

In one embodiment, the update process is initiated by an update agent running on the electronic device. The update agent controls the reception and verification of the delta file. Subsequently, the update agent causes the electronic device to be disconnected from the network and the update process to be performed. An embodiment of an update process will be described in greater detail below.

The generation of a delta file may schematically be illustrated by the following operations $$\text{file}_{new} - \text{file}_{base} \rightarrow \Delta\text{file},$$

where file $\text{file}_{new}$ denotes the updated version of the software, $\text{file}_{base}$ denotes the current version of the software, and $\Delta\text{file}$ denotes the delta update instructions.

Correspondingly, the actual generation of the new version may then be performed by the electronic device according to the following operation $$\text{file}_{base} + \Delta\text{file} \rightarrow \text{file}_{new}.$$

It is understood that the above operations of generating the delta file (denoted as "−" in the above notation) and generating the new version on the electronic device (denoted as "+" operation in the above notation) may comprise more or less complex operations. The term applying update instructions to software, e.g. a load module, generally refers to the operations for generating an updated version of the software from the current version of the software and from the update instructions.

As will be described in more detail below, the software to be updated may comprise a plurality of load modules. Accordingly, the delta file may include a corresponding plurality of delta-file sections, each for generating an updated version of one of the load modules. It will be appreciated that alternatively an update package may include a plurality of separate delta files, each for updating one of the load modules. The delta file may be applied in-place, i.e. the changes are made by the electronic device on the existing image, thereby requiring little additional storage. Furthermore, since only the delta file needs to be loaded and since the delta file typically is considerably smaller than the new version, the loading time is reduced by the above method.

Figure 2:
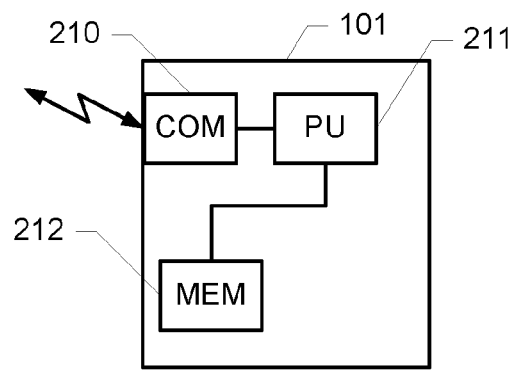
FIG. 2 schematically shows a block diagram of an electronic device such as a mobile terminal.

FIG. 2 schematically shows a block diagram of an electronic device such as a mobile terminal. The electronic device 101 comprises a communications block 210, a processing unit 211, and a memory unit 212.

The communications block 210 comprises circuitry and/or devices allowing radio-based communication of data via a cellular communications network. Hence, the communications block 210 may comprise receiver circuitry and transmitter circuitry for receiving and transmitting data signals.

The communications block may further comprise circuitry for suitably processing—e.g. modulating, coding, amplifying, etc.—the signals by suitable techniques well known as such in the art of radio communications.

The electronic device further comprises a processing unit 211, e.g. a suitably programmed microprocessor. The processing unit may be adapted to determine the version of the software stored in the electronic device, to calculate checksums of the stored software, and to generate an updated version of the software upon receipt of corresponding update instructions.

The memory unit 212 comprises non-volatile memory that has stored thereon the software in a predetermined version. For example, the memory 212 may comprise the firmware of the electronic device that implements functions of the electronic device when loaded into and executed by the processing unit 210. The firmware may further comprise an operating system allowing application software to be executed. Accordingly, the memory 212 may further have stored thereon application software providing additional functionality. The memory 212 is addressed using a suitable address space, thereby allowing the processing unit to access selected parts of the memory. In some embodiments the memory 212 may be logically or physically divided in a plurality of memory sectors. For example, the memory 212 may comprise flash memory allowing data to be written in sectors of a predetermined size.

It is further understood that the updating process described herein may be applied to the entire memory 212, e.g. if the entire image of the flash memory of a mobile phone is to be updated, or to only predetermined parts of the memory, e.g. if one or more software applications are to be updated.

It will further be appreciated that the electronic device may further comprise volatile memory such as a RAM.

Figure 3:
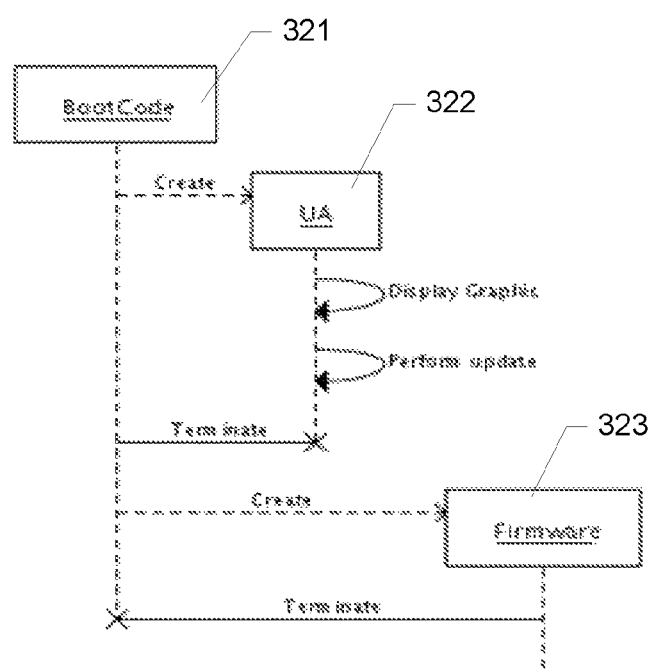
FIG. 3 illustrates an example of a conventional start-up sequence.

FIG. 3 illustrates an example of a conventional start-up sequence during an update of the firmware of an electronic device. In this example, when the electronic device is powered on, the system initially executes a boot code 321. The boot code causes a firmware update agent 322 to be loaded, i.e. a standalone piece of code which makes changes to the main body of firmware code. During its execution, the update agent may cause the electronic device to display a suitable indication of the progress of the update process. Upon completion of the update, the update agent may terminate and the updated firmware 323 may be executed.

Even if it is possible to perform background updates of the main firmware code while the firmware is executing, the standalone update agent 322 is still required to continue the update should it be interrupted e.g. if the device looses power during an update. For any system performing an in-place update, a standalone Firmware Update Agent 322 is required to allow the system to recover from a power interruption during the update. The standalone Firmware Update Agent 322 causes code duplication. If the Firmware Update Agent contains an operating system (OS) core, it may take up significant additional persistent memory resources on the embedded device. If the Firmware Update Agent is written to be OS free, any drivers it requires would need to be maintained in both the OS (for the main firmware) and the OS free (for the Firmware Update Agent) versions. This increases the costs of developing and maintaining the system. If the system is capable of performing background updates, all the functionality required in the Firmware Update Agent 322 will also be duplicated in the main firmware. The stand-alone Firmware Update Agent322 is still required as loss of power during an inplace update of the main firmware will leave the main firmware in a state where it cannot be executed to continue the update.

Figure 4:
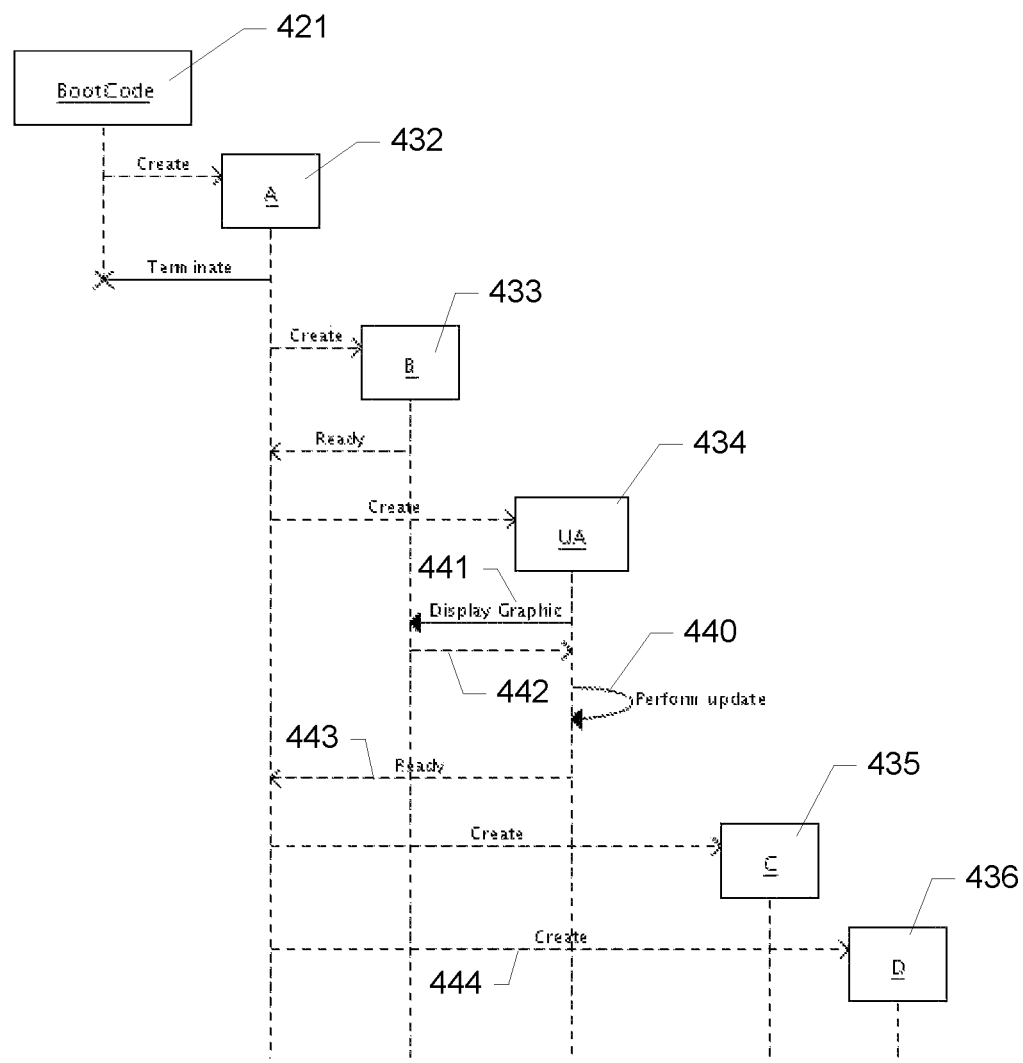
FIG. 4 illustrates an example of a start-up sequence of a modular system.
Figure 5:
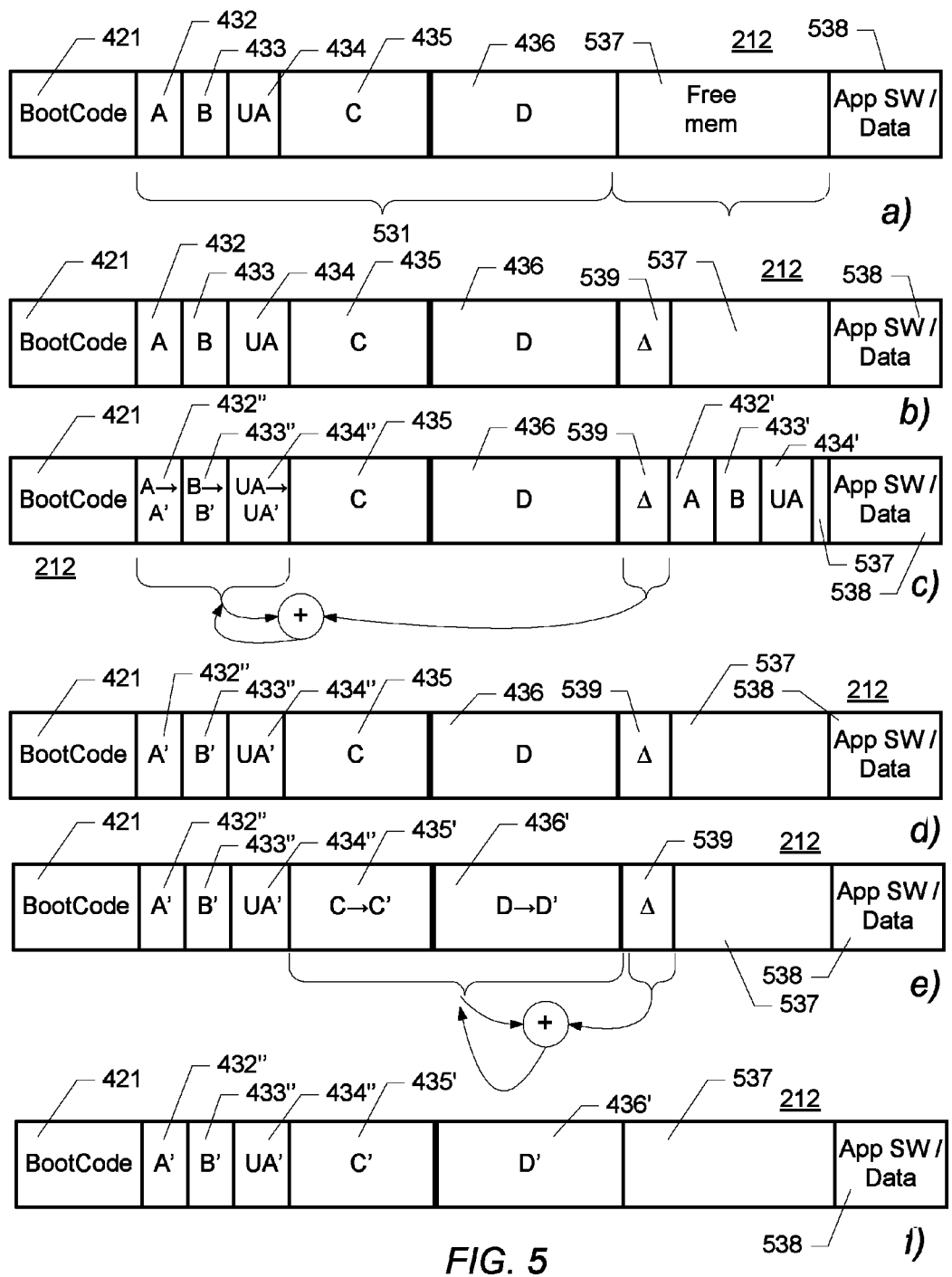
FIG. 5 schematically illustrates an example memory layout of the persistent memory of an electronic device during an update process as described herein.
Figure 6:
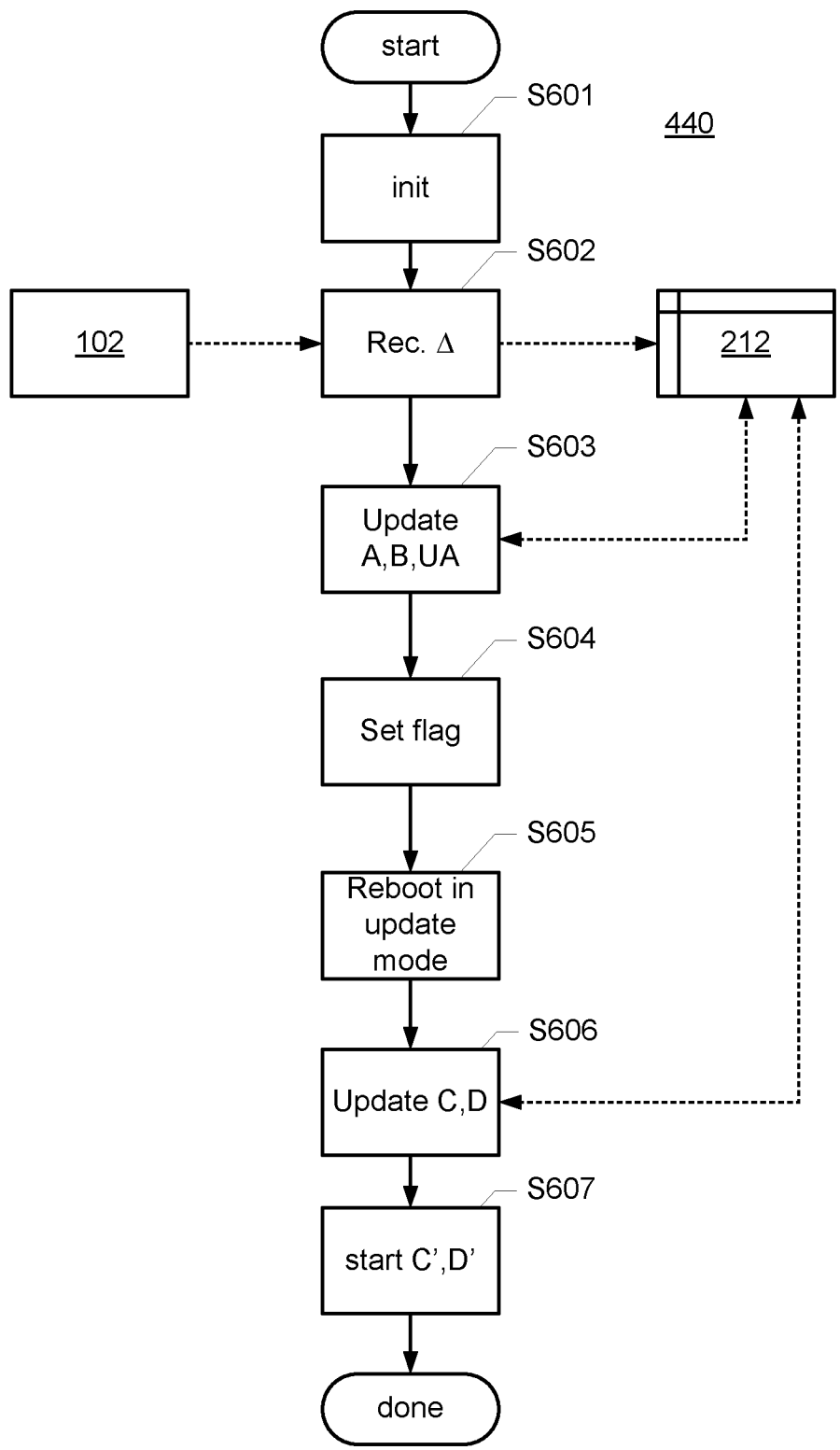
FIG. 6 shows a flow diagram of an example of an update process.

In the following, an embodiment of an update process will be described with reference to FIGS. 4-6. FIG. 4 illustrates an example of a start-up sequence of a modular architecture for updating an electronic device, while FIG. 5 schematically illustrates an example of a memory layout of the persistent memory 212 of an electronic device during an update process as described herein, e.g. the electronic device 101 described in connection with FIGS. 1 and 2. In particular, FIG. 5*a* shows an example of a memory layout prior to an update. FIG. 6 shows a flow diagram of an example of an update process.

In the embodiment illustrated in FIGS. 4 and 5*a*, an electronic device has stored thereon boot code 421, and firmware 531 for controlling the operation of the electronic device. The boot code 421 generally includes the first instructions to be executed upon start-up (boot) of the electronic device. The firmware 531 is arranged as a modular system comprising a number of load modules designated load module A (432), load module B (433), update agent UA (434), load module C (435) and load module D (436). Load module A is the core load module that provides basic system services, e.g. the operating system, and is started by the boot code 421. For example, core load module A may contain the core operating system and other required physical drivers such as flash drivers, power control drivers, 10, file system drivers, etc. Load module B is the load module that provides the basic services required by the update agent 434 in addition to the services provided by load module A. Thus, load module B may contain code which is not part of the core OS but is used during an update. For example, on a device with a display, load module B may include the display drivers, codecs, etc. required for reporting progress of an update. For battery powered devices load module B may include the algorithms for controlling battery charging. The update agent UA is a load module that includes the code which actually performs any update 440 if an update is required or desired. Load modules C and D are other load modules which comprise the rest of the firmware. For examples load modules C and/or D may contain code which is not required to execute during an update, e.g. applications, network stacks, audio drivers, video codecs, etc.

In the start-up sequence of FIG. 4, the boot code 421 is executed upon power-up of the electronic device. The boot code 421 starts the core load module A that provides basic system services. After successful start-up of load module A, the boot code may terminate. The core load module A then starts the remaining load modules in a predetermined order corresponding to their interdependencies. In particular, the core load module A starts load module B before starting the update agent UA, as the update agent requires services provided by load module B, as is illustrated by arrows 441 and 442 illustrating that the update agent may use display services provided by load module B in order to display a progress indication on a display of the electronic device during an ongoing update 440.

As indicated in FIG. 4, the update agent may perform an update 440 when triggered to do so, e.g. upon start-up. When the update is completed (or not required), the update agent UA may send a "ready" signal 443 to the core load module A, causing load module A to start the remaining load modules C and D. As will be described in greater detail below, the start-up sequence shown in FIG. 4 may be applied during a second stage of an update process where the load modules C and D are updated. During an initial stage of an update, the update agent may perform an update of load modules A, B, and/or UA while load modules C and D are running, i.e. at a later point in the start-up sequence, e.g. after start-up 444 of load module D.

During an update 440, the update agent makes the required changes to the system. In some embodiments, the update agent may be capable of running while the rest of the system, e.g. load modules C and D, are running. However, the update agent is not dependent on load modules C and D running. The particular update technology implemented within the update agent may dictate whether the majority of the system must be shut down first or whether it may be left running during at least a part of the update process.

Even though FIGS. 4 and 5 show an example where the firmware is structured into five load modules, it will be appreciated that in alternative embodiments, the firmware may be divided into a different number of load modules and/or the firmware functionality may be divided between the load modules in a different way. For example, load modules A and B may be combined into a single load module and/or the functionality of module B may be divided among a plurality of load modules, and/or the functionality that is not required by the update agent, i.e. the functionality provided by load modules C and D in the example of FIGS. 4 and 5, may be provided by a single load module or by a larger number of load modules.

The persistent memory 212 of the electronic device may further have stored therein additional software components, e.g. application software, and/or data such as configuration data, data generated and/or used by the firmware and/or by application software, etc. Hence, in addition to the firmware 531, a portion 538 of the persistent memory 212 may be occupied by such software components and/or data. It will be appreciated that the update process described herein may also update parts or all of the application software and/or even parts or all of the data. Finally, the persistent memory 212 of FIG. 5a is shown to have a free portion 537 of memory available that may be used to store additional data and/or software.

The firmware and any additional software components may be stored in any suitable file system format which may be the same or different for the firmware and any additional software components. For example, the firmware may be stored in a monolithic or in a non-monolithic structure.

FIG. 5a shows the load modules to occupy a consecutive memory space. However, it will be appreciated that the allocation of load modules to memory space may be done in a different way. Further, even though shown in FIG. 5 to be stored in the same persistent memory as the firmware, it will be appreciated that the boot code 421 may alternatively be stored in a separate memory, e.g. in a Read Only memory (ROM). Similarly, the application software/data 538 and the available free memory space 537 may be arranged differently than the example illustrated in FIG. 5a, e.g. distributed over a number of different parts of the memory.

Now referring to FIG. 6 and with continued reference to FIGS. 4 and 5, an example of an update process will be described. In an initial step S601, the update process is initiated. For example, the update process may be initiated by a suitable user input, e.g. by the user connecting the electronic device to an external update system, by the user invoking a user interface of the update agent, etc. Alternatively, the update process may be initiated automatically, e.g. triggered by a timer function that causes the update agent to contact a remote update system (e.g. system 102 described in connection with FIG. 1) to check whether any relevant updates are available, or triggered by a message received from a remote update system indicating that an update is available, or in any other suitable way.

In step S602, the electronic device downloads under control of the update agent a delta update package 539 from an external update system, e.g. system 102 shown in FIG. 1. The download process may be performed in any suitable way known as such in the art. In particular, the download process may comprise a verification step during which the electronic device verifies the authenticity and/or integrity of the received delta package, e.g. as described in WO 2005/050441. Further examples of suitable verification processes include any method suitable for verifying the integrity and/or authenticity of the received data, e.g. by means of checksums, CRCs, cryptographic checksums, digital signatures, message authentication codes, etc. The downloaded update package 539 is stored in the persistent memory 212.

FIG. 5b shows the persistent memory after download of the delta update package 539. The received delta update package 539 includes update instructions for updating the respective load modules of the firmware 431. The delta update package 539 comprises a first set of update instructions for updating the load modules A, B, and the update agent UA, and a second set of update instructions for updating the load modules C and D. Since the delta update package only includes incremental update instructions, it may be kept relatively small, thereby requiring only a small amount of free memory 537.

In step S603, the load modules required by the update agent, i.e. in this example load modules A, B and the update agent UA itself, are updated in a failsafe manner using the first set of update instructions of the delta update package. For example, the update agent may create updated versions 432', 433', 434' of load modules A, B, and of the update agent UA itself, respectively. For example, the update agent may copy the load modules A, B, and UA into an available space 537 of the persistent memory, and then apply the first set of delta update instructions to the current version of the load modules to make an in-place update of the current versions, e.g. while the current versions of load modules A, B, and UA are executed from a RAM of the electronic device. The generation of the updated versions 432"-434" is schematically illustrated in FIG. 5c. Once the updated versions 432"-434" are generated and verified successfully, the update agent may delete the copied versions 432'-434', resulting in the memory layout illustrated in FIG. 5d. If, the generation of the updated versions 432"-434" is interrupted or otherwise fails, the system may be booted from the backed-up versions 432'-434'.

It will be appreciated that a fail-safe update of the modules A, B, and UA may be performed in a different manner. In particular, the update may be performed such that the execution address of the code executed during the update is not the same as the storage address for the version of the first set of load modules being updated. This may be achieved in a number of different ways, e.g. they may be copied into RAM and executed, or a memory management unit (MMU) may be used to map the stored address to a virtual execution address, or the code may be inherently relocatable so it can be executed from any address. For example, the update agent may make a backup of load modules A, B, UA and perform an in-place update on the backup version, thus allowing the entire system to be running even in an electronic device where the firmware is not loaded into RAM for execution but executed in place. In such an embodiment, after successful completion of the update, a master boot record or another suitable reference may be changed to point to the updated version before rebooting so as to cause the boot loader to execute the updated version. In any event, the update of modules A, B, UA is performed in such a way that the original versions of A, B, and UA are still available until the generation of the updated versions is successfully completed. This way, if the generation of the updated versions fails or is interrupted prematurely, the electronic device can be rebooted based on the original versions, and the update process can be resumed or restarted based on the stored delta update package.

Even though all three load modules A, B, and UA are indicated as being updated in the present example, it will be appreciated that some updates may only affect one or some of the load modules, while leaving the others unchanged. It will further be appreciated that in such a situation, only backups of those load modules need to be made that are actually affected by the update. For example, in some updates only load modules A, B, C, and D may be affected, thus leaving the update agent unchanged. In another update, only load modules C and/or D may be affected, etc. Furthermore, if an update only affects load modules C and D, steps S603-S605 may be skipped. For the purpose of the present description the versions of all load modules after an update are referred to as updated versions, irrespective of whether each load module actually was changed by the update. Hence, in some situations, the updated version of one or more of the load modules may be identical to the current version of the corresponding load module.

When the fail-safe update of load modules A, B, and UA is successfully completed, the process continues at step S604 and sets a flag so as to cause the device to load the new load modules A', B' and UA' during the subsequent boot sequence. The backups made during the update process may be deleted. In some embodiments, even the first set of update instructions may be removed from the memory at this point.

In subsequent step S605, the electronic device is rebooted, e.g. by using the start-up process illustrated in FIG. 4 but based on the updated versions A', B', and UA' of the load modules required for the update process.

In subsequent step S606, the remaining load modules (i.e. load modules C and D in the present example) requiring an update are updated while only the updated versions of the update agent UA' and load modules A' and B' are running. This may be performed by applying the second set of update instructions of the delta update package 539 to perform an in-place update of load modules C and D, e.g. as schematically illustrated in FIG. 5e and resulting in an updated memory layout illustrated in FIG. 5f. Generally, the term in-place update refers to an update where the updated version is generated over the original version, thus resulting in the updated version occupying at least some of the space previously occupied by the old version. Hence, step S606 results in the load modules C and D to be replaced by their respective updated versions C' (435') and D' (436'). If an update is interrupted during this step, e.g. if the battery for the embedded device was removed, the update would continue when the embedded device was restarted without the need for a separate standalone update agent and without the need for reconnecting any external system.

The application of the delta file to create updated versions of the load modules in steps S603 and S606 may be performed in any suitable way known as such, e.g. as described in WO 2007/071324 which discloses an example of a process for generating delta updates for load modules, and an example of an update agent for applying such delta updates.

After successful completion, the process proceeds at step S607, wherein the update agent UA' may clean up any backups and the stored delta update package, and send a ready signal to the core load module A', causing the core load module A' to start the updated load modules C' and D' as illustrated in FIG. 4. After successful completion of the update process, the updated version of the update agent may terminate or continue to run, e.g. so as to be able to initiate a subsequent update of load modules A, B, and/or UA as a background process.

Hence, in the embodiment of an update process described above, after receipt and storage of the update instructions, the update process is performed in two stages: In a first stage any updates to load modules that are required by the update agent are performed as well as any updates to the update agent itself. These updates are performed in a fail-safe manner, such that an operational version of the load modules required by the update agent is always present in the electronic device. Then the electronic device is rebooted, e.g. using the start-up sequence of FIG. 5, and the remaining load modules are updated.

Although some embodiments have been described and shown in detail, the invention is not restricted to them, but may also be embodied in other ways within the scope of the subject matter defined in the following claims. In particular, even though the update process described herein has mainly been described in connection with the update of firmware, it will be appreciated that the update process may also be applied to updates including other software components such as application software. Furthermore, it is noted that the above embodiments have mainly been described with reference to flash memory. However, it is understood that the method described herein may also be implemented in connection with other types of storage media, such as optical disks, hard disks, floppy disks, tapes, and/or other types of magnetic and/or optical storage media.

The invention can be implemented by means of hardware comprising several distinct elements, and by means of a suitably programmed computer or other processing device. In the device claims enumerating several means, several of these means can be embodied by one and the same item of hardware, e.g. a suitably programmed microprocessor or computer, and/or one or more communications interfaces as described herein. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for updating software of an electronic device from a current version of the software to an updated version of the software, the electronic device comprising a storage medium having stored therein the current version of the software; the method comprising the following steps performed by the electronic device:

receiving incremental update instructions for causing the electronic device to transform the stored current version of the software into the updated version of the software, wherein the software comprises a first and a second set of load modules, the first set of load modules comprising program code for providing a minimal set of basic system services required for operating the electronic device in an update mode and program code for providing functionality for performing the update, the received incremental update instructions comprising a first set of update instructions for causing the electronic device to generate an updated version of the first set of load modules, the received incremental update instructions further comprising a second set of update instructions for causing the electronic device to generate an updated version of the second set of load modules;

storing at least the second set of update instructions in the storage medium;

executing the first set of update instructions so as to update the stored current version of the first set of load modules to the generated updated version of the first set of load modules;

booting the electronic device in an update mode in which the updated version of the first set of load modules is executed; and executing the stored second set of update instructions so as perform an in-place update of the second set of load modules, the in-place update comprising replacing the stored current version of the second set of load modules with the generated updated version of the second set of load modules, wherein the electronic device is a portable radio communications device for communicating via a radio communications network, wherein the software includes communications functionality for establishing radio communications between the communications device and another communications device of the radio communications network; and wherein said communications functionality is included in the second set of load modules.

2. A method according to claim 1, wherein the first set of load modules comprises a core load module adapted to provide a minimal set of basic system services required for operation of the electronic device, and a second load module adapted to provide a minimal set of basic services required for performing the update.

3. A method according to claim 2, wherein the core load module comprises a core operating system of the electronic device and one or more required physical drivers.

4. A method according to claim 2, wherein the second load module comprises program code required for controlling the electronic device to indicate a progress of the update process to a user of the electronic device.

5. A method according to claim 1, wherein the first set of load modules comprises an update agent load module for controlling the update process; and wherein executing the stored second set of update instructions comprises executing the stored second set of update instructions under control of the update agent load module of the updated version of the first set of load modules.

6. A method according to claim 1, wherein booting the electronic device in the update mode comprises executing only the first set of load modules, and wherein executing the first set of load modules comprises executing the updated version of the first set of load modules.

7. A method according to claim 1, wherein the electronic device further has stored thereon a boot loader program, and wherein booting the electronic device in the update mode comprises:

executing the boot loader program;

initiating execution of at least one of the first set of load modules under the control of the boot loader program; and initiating execution of the update agent load module under the control of the at least one of the first set of load modules.

8. A method according to claim 1, further comprising setting a flag after successful completion of the step of executing the first set of update instructions, said flag indicating to the electronic device that during a subsequent boot process the electronic device is to be booted in the update mode.

9. A method according to claim 1, wherein the software includes firmware.

10. A method according to claim 1, wherein the electronic device is operatable in the update mode without execution of the second set of load modules.

11. A method according to claim 1, wherein the storage medium is a persistent memory.

12. A method according to claim 1, wherein executing the first set of update instructions so as to update the stored current version of the first set of load modules to the generated updated version of the first set of load modules comprises:

creating a backup of the first set of load modules and executing the first set of update instructions so as to replace the stored backup of the first set of load modules with the generated updated version of the first set of load modules; and switching the backup and original versions of the first set of load modules.

13. A method according to claim 1, further comprising executing the updated versions of the second set of load modules.

14. A method according to claim 1, wherein storing at least the second set of update instructions in the storage medium comprises storing the first and second sets of update instructions in the storage medium.

15. An electronic device controllable by software, the electronic device comprising a nontransitory storage medium having stored therein a current version of the software, wherein the electronic device is configured to perform the steps of a method for updating software of the electronic device from a current version of the software to an updated version of the software; the method comprising the following steps performed by the electronic device:

receiving incremental update instructions for causing the electronic device to transform the stored current version of the software into the updated version of the software, wherein the software comprises a first and a second set of load modules, the first set of load modules comprising program code for providing a minimal set of basic system services required for operating the electronic device in an update mode and program code for providing functionality for performing the update, the received incremental update instructions comprising a first set of update instructions for causing the electronic device to generate an updated version of the first set of load modules, the received incremental update instructions further comprising a second set of update instructions for causing the electronic device to generate an updated version of the second set of load modules;

storing at least the second set of update instructions in the storage medium;

executing the first set of update instructions so as to update the stored current version of the first set of load modules to the generated updated version of the first set of load modules;

booting the electronic device in an update mode in which the updated version of the first set of load modules is executed; and executing the stored second set of update instructions so as perform an in-place update of the second set of load modules, the in-place update comprising replacing the stored current version of the second set of load modules with the generated updated version of the second set of load modules, wherein the electronic device is a portable radio communications device for communicating via a radio communications network, wherein the software includes communications functionality for establishing radio communications between the communications device and another communications device of the radio communications network; and wherein said communications functionality is included in the second set of load modules.

16. A nontransitory computer readable storage means having stored thereon a boot loader program and software, the computer program product comprising program code means adapted to cause an electronic device to perform the steps of a method when said program code means are executed by the electronic device, wherein the method is for updating software of the electronic device from a current version of the software to an updated version of the software, the electronic device comprising a storage medium having stored therein the current version of the software; the method comprising the following steps performed by the electronic device:

receiving incremental update instructions for causing the electronic device to transform the stored current version of the software into the updated version of the software, wherein the software comprises a first and a second set of load modules, the first set of load modules comprising program code for providing a minimal set of basic system services required for operating the electronic device in an update mode and program code for providing functionality for performing the update, the received incremental update instructions comprising a first set of update instructions for causing the electronic device to generate an updated version of the first set of load modules, the received incremental update instructions further comprising a second set of update instructions for causing the electronic device to generate an updated version of the second set of load modules;

storing at least the second set of update instructions in the storage medium;

executing the first set of update instructions so as to update the stored current version of the first set of load modules to the generated updated version of the first set of load modules;

booting the electronic device in an update mode in which the updated version of the first set of load modules is executed; and executing the stored second set of update instructions so as perform an in-place update of the second set of load modules, the in-place update comprising replacing the stored current version of the second set of load modules with the generated updated version of the second set of load modules, wherein the electronic device is a portable radio communications device for communicating via a radio communications network, wherein the software includes communications functionality for establishing radio communications between the communications device and another communications device of the radio communications network; and wherein said communications functionality is included in the second set of load modules.

* * * * *